United States Patent
Kim et al.

(10) Patent No.: US 9,321,051 B2
(45) Date of Patent: *Apr. 26, 2016

(54) MICROFLUIDIC DEVICE AND METHOD OF MANUFACTURING THE SAME

(71) Applicant: Samsung Electronics Co., Ltd., Suwon-si, Gyeonggi-do (KR)

(72) Inventors: Jae-young Kim, Seoul (KR); Won-jong Jung, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 91 days.

This patent is subject to a terminal disclaimer.

(21) Appl. No.: 13/890,041

(22) Filed: May 8, 2013

(65) Prior Publication Data

US 2013/0251604 A1    Sep. 26, 2013

Related U.S. Application Data

(63) Continuation-in-part of application No. 12/825,802, filed on Jun. 29, 2010, now Pat. No. 8,444,933.

(30) Foreign Application Priority Data

Dec. 22, 2009 (KR) .................. 10-2009-0129133

(51) Int. Cl.
*B01L 99/00* (2010.01)
*B01L 3/00* (2006.01)
*F16K 99/00* (2006.01)

(52) U.S. Cl.
CPC ....... *B01L 3/502738* (2013.01); *F16K 99/0015* (2013.01); *F16K 99/0059* (2013.01);

(Continued)

(58) Field of Classification Search
CPC .................. B01L 2300/123; B01L 2400/0638; B01L 2300/0816; B01L 2300/0087; F16K 99/0015; F16K 2099/0084
See application file for complete search history.

(56) References Cited

U.S. PATENT DOCUMENTS 7,125,478 B2    10/2006    Selvaganapathy et al.
2002/0081222 A1*    6/2002    Karp .............................. 417/507

(Continued)

FOREIGN PATENT DOCUMENTS

JP    63-122037 A    5/1998
KR    1020020074070 A    9/2002

(Continued)

OTHER PUBLICATIONS

Hua et al. *Journal of Micromechanics and Microengineering*, 16: 1433-1443 (2006).

(Continued)

*Primary Examiner* — Paul Hyun
(74) *Attorney, Agent, or Firm* — Leydig, Voit & Mayer, Ltd.

(57) ABSTRACT

A microfluidic device comprising a first substrate including a micro-flow path and a valve seat protruding into the micro-flow path, a second substrate coupled to the first substrate and including a cavity aligned with the valve seat, and a valve gate film provided between the first substrate and the second substrate, such that the valve gate film opens and closes the micro-flow path with air pressure applied to the cavity, wherein a surface of the valve seat is separated from the valve gate film at the initial stage such that the micro-flow path is opened at the initial stage, and the valve gate film moves to be in contact with the surface of the valve seat so that the micro-flow path is closed when air pressure is applied to the cavity.

9 Claims, 8 Drawing Sheets

(52) U.S. Cl.
CPC .. *B01L2300/0816* (2013.01); *B01L 2400/0655* (2013.01); *F16K 2099/008* (2013.01); *F16K 2099/0084* (2013.01)

(56) References Cited

U.S. PATENT DOCUMENTS

| | | | |
|---|---|---|---|
| 2004/0018523 | A1 | 1/2004 | Hawkins et al. |
| 2004/0146849 | A1* | 7/2004 | Huang et al. .................. 435/4 |
| 2004/0209354 | A1 | 10/2004 | Mathies et al. |
| 2006/0237065 | A1 | 10/2006 | Enerson et al. |
| 2007/0166200 | A1* | 7/2007 | Zhou et al. .................. 422/100 |
| 2007/0237686 | A1 | 10/2007 | Mathies et al. |
| 2007/0248958 | A1* | 10/2007 | Jovanovich et al. .............. 435/6 |
| 2008/0008628 | A1 | 1/2008 | Park et al. |
| 2008/0014576 | A1 | 1/2008 | Jovanovich et al. |
| 2008/0017306 | A1* | 1/2008 | Liu et al. .................. 156/297 |
| 2009/0051901 | A1* | 2/2009 | Shen et al. .................. 356/73 |
| 2010/0303687 | A1 | 12/2010 | Blaga et al. |
| 2011/0126911 | A1* | 6/2011 | Kobrin et al. .................. 137/1 |

FOREIGN PATENT DOCUMENTS

| | | |
|---|---|---|
| KR | 100449668 B1 | 9/2004 |
| KR | 100790881 B1 | 12/2007 |
| KR | 1020090043707 A | 5/2009 |
| KR | 1020090059419 A | 6/2009 |

OTHER PUBLICATIONS

Korean Office Action for Application No. 10-2009-0129133 mailed on Mar. 22, 2015.

Takao, H. et al., "A MEMS microvalve with PDMS diaphragm and two-chamber configuration of thermo-pneumatic actuator for integrated blood test system on silicon," *Sensors and Actuators A 119*, 468-475 (2005).

Han, J. et al., "Micro-fabricated membrane gas valves with a non-stiction coating deposited by $C_4F_8$/Ar plasma," *J. Micromechanics and Microengineering*, 18, 1-9 (2008).

* cited by examiner

MICROFLUIDIC DEVICE AND METHOD OF MANUFACTURING THE SAME

CROSS-REFERENCE TO RELATED APPLICATIONS

This application is a continuation-in-part application of U.S. patent application Ser. No. 12/825,802, filed on Jun. 29, 2010, and claims priority to Korean Patent Application No. 10-2009-0129133, filed on Dec. 22, 2009, and all the benefits accruing therefrom under 35 U.S.C. §119, the contents of which in their entirety are herein incorporated by reference.

BACKGROUND

1. Field

Provided is a microfluidic device and a method of manufacturing the microfluidic device.

2. Description of the Related Art

A sample related to a clinic or environment is analyzed by a series of biochemical, chemical, and mechanical processes. Technical development for biological diagnosis or monitoring of a sample has attracted wide attention. Also, a molecular diagnosis method based on nucleic acid exhibits superior accuracy and sensitivity, and thus, is widely used for infectious disease or cancer diagnosis, pharmacogenomics, and new drug development. A lab-on-a-chip ("LOC") having a microfluidic device is widely used to conveniently and accurately analyze a sample according to a variety of purposes. In the microfluidic device, since a plurality of members such as a sample input hole, a sample output hole, a micro-flow path, and a reaction chamber are formed in a thin substrate, a variety of tests may be conveniently performed with respect to a single sample.

The substrate of the microfluidic device may be a glass substrate, a plastic substrate, or a silicon substrate. The glass substrate is widely used when there is a demand to optically verify a biochemical reaction due to transparent and hydrophilic property of a surface thereof. The microfluidic device reliably performs basic functions such as transportation, mixing, or separation of a fluid in a quantity desired by a user, by using a valve or a pump system. To operate the valve or pump system of the microfluidic device, thermal, magnetic, electrical, or pneumatic methods are used. Of the methods, the pneumatic method is widely used because it is relatively simple.

The microfluidic device having a pneumatic valve system basically includes a first substrate where a micro-flow path through along which a liquid flows is formed, a valve gate film for opening/closing a valve formed of a flexible material, and a second substrate for controlling the valve gate film using air pressure. In the microfluidic device configured as above, the fluid is sealed without leakage and the fluid can be freely transferred via the valve as much as the quantity desired by the user. Accordingly, the connection between the valve gate film and the substrate has become one of important issues.

SUMMARY

Provided are a microfluidic device and a method of manufacturing the microfluidic device.

Embodiments will be set forth in part in the description which follows and, in part, will be apparent from the description, or may be learned by practice of the illustrated embodiments.

Provided is a microfluidic device which includes a first substrate including a micro-flow path and a valve seat protruding into the micro-flow path, a second substrate coupled to the first substrate and including a cavity aligned with the valve seat, and a valve gate film provided between the first substrate and the second substrate, such that the valve gate film opens and closes the micro-flow path with air pressure applied to the cavity, in which a surface of the valve seat is separated from the valve gate film at the initial stage such that the micro-flow path is opened at the initial stage, and the valve gate film moves to be in contact with the surface of the valve seat so that the micro-flow path is closed when air pressure is applied to the cavity.

The valve gate film may have a hydrophobic surface.

The valve gate film may be formed of PDMS.

The first substrate may be formed of polymer based plastic and has a hydrophobic surface.

The first substrate may be formed of a material including PMMA, PS, PC, or PE.

The microfluidic device may further include hydrophilic coating formed on an entire surface of the first substrate facing the valve gate film.

The hydrophilic coating may be formed of $SiO_2$.

The first substrate may be formed of a glass based material or a polymer material including a silicon-oxygen bonding and has a hydrophilic surface.

The first substrate and the valve gate film may be bonded to each other without an intermediate layer therebetween.

The second substrate may be formed of polymer based plastic and has a hydrophobic surface.

The second substrate may be formed of a material including PMMA, PS, PC, or PE.

The microfluidic device may further include hydrophilic coating formed on an entire surface of the first substrate facing the valve gate film.

The hydrophilic coating may be formed of $SiO_2$.

The second substrate may be formed of a glass based material or a polymer material including a silicon-oxygen bonding and has a hydrophilic surface.

The second substrate and the valve gate film may be bonded to each other without an intermediate layer therebetween.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
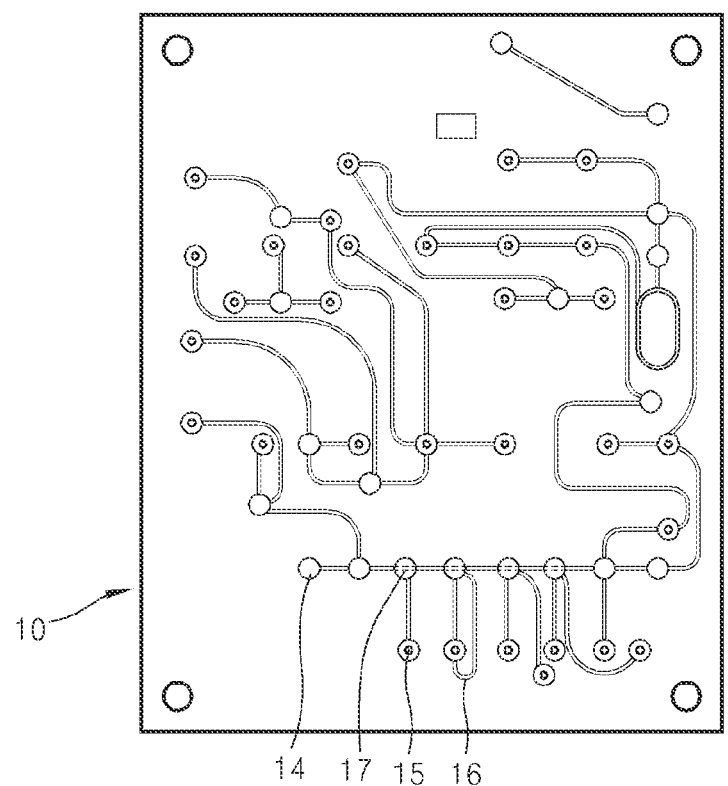
FIG. 1 schematically illustrates the structure of an embodiment of microfluidic device.

Reference will now be made in detail to embodiments, examples of which are illustrated in the accompanying drawings, wherein like reference numerals refer to the like elements throughout. In this regard, the illustrated embodiments may have different forms and should not be construed as being limited to the descriptions set forth herein. Accordingly, the embodiments are merely described below, by referring to the figures, to explain features of the present invention.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. As used herein, the term "and/or" includes any and all combinations of one or more of the associated listed items. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 schematically illustrates an embodiment of a structure of a microfluidic device 10. Referring to FIG. 1, the microfluidic device 10 may include, for example, in a thin and transparent substrate, a plurality of a hole 15 for inputting/outputting a sample or air, a plurality of a reaction chamber 14 in which chemical/biological reaction of the sample occurs, a plurality of a micro-flow path 16 along which the sample flows, and a plurality of a microvalve 17 for accurately controlling the flow of the sample toward a desired position. The holes 15 may separately include holes for inputting/outputting the sample only, and holes for inputting/outputting the air only to control the microvalves 17. The microvalves 17 block or allow the flow of the sample or air in the micro-flow paths 16. The reaction chambers 14, the holes 15 and/or the micro-flow paths 16 may be considered enclosed openings in the substrate of the microfluidic device 10, such that the substrate solely defines the enclosed reaction chambers 14, holes 15 and/or micro-flow paths 16

Figure 2:
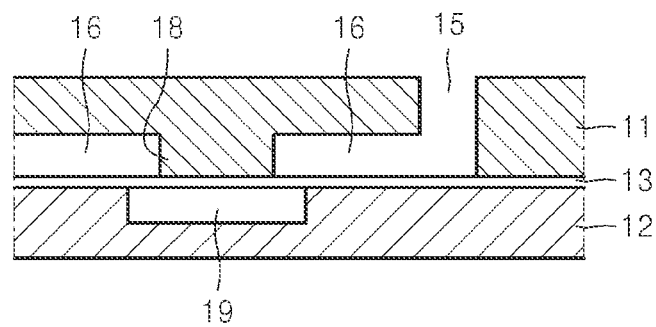
FIG. 2 is a cross-sectional view illustrating an embodiment of a valve portion of the microfluidic device of FIG. 1.

FIG. 2 is a cross-sectional view illustrating an embodiment of a valve portion of the microfluidic device 10 of FIG. 1. Referring to FIG. 2, a valve seat 18 protrudes into the micro-flow path 16 disposed in a first substrate 11. A cavity 19 corresponding to and aligned with the valve seat 18 is disposed in a second substrate 12. The valve seat 18 and the cavity 19 may be separated by a valve gate film 13 disposed between the first substrate 11 and the second substrate 12. The valve gate film 13 is combined to each of the first and second substrates 11 and 12. The valve gate film 13 may include a flexible material, such as polymer. The micro-flow path 16 disposed in the first substrate 11 may be fluidly connected to the hole 15 through which the sample is input/output from the microfluidic device 10. The cavity 19 disposed in the second substrate 12 may be fluidly connected to the hole 15 through which air is input/output.

Figure 3:
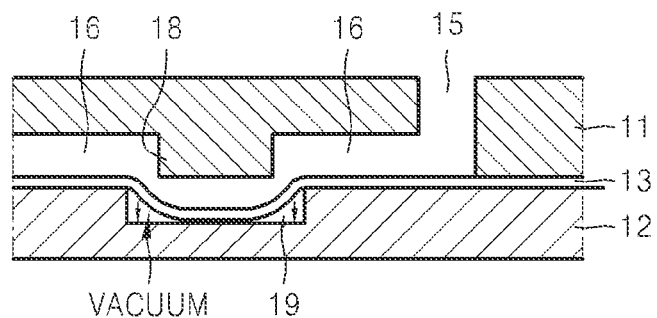
FIGS. 3 and 4 are cross-sectional views, respectively, illustrating the open and closed states of the valve of the microfluidic device of FIG. 1.
Figure 4:
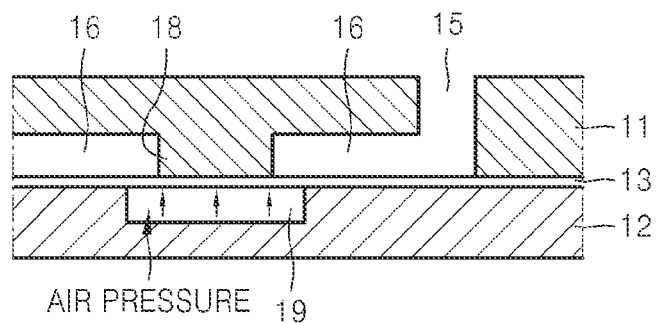

FIG. 3 illustrates that the valve of FIG. 2 is open, whereas FIG. 4 illustrates that the valve of FIG. 2 is closed. Referring to FIG. 3, when vacuum is applied to the cavity 19 in the second substrate 12, the valve gate film 13 is pulled toward the cavity 19 to open the micro-flow path 16, such that first and second portions of the micro-flow path 16 disposed on opposing sides of the valve seat 18 are in fluid connection with each other. Accordingly, the sample or air input through the hole 15 may flow to a specific position along the micro-flow path 16.

Referring to FIG. 4, when air pressure is applied to the cavity 19, the valve gate film 13 is pushed toward the valve seat 18 to close the micro-flow path 16. When the valve gate film 13 is pushed toward the valve seat 18 as illustrated in FIG. 4, the first and second portions of the micro-flow path 16 disposed on opposing sides of the valve seat 18 are not in fluid connection with each other, since the valve seat 18 completely separates the first and second portions from each other. Accordingly, the flow of the sample may be stopped.

In the microfluidic device configured as above, when a glass substrate having a hydrophilic surface is used as the first and second substrates 11 and 12, the valve seat 18 may adhere to the valve gate film 13 after the manufacturing process of the microfluidic device or during the operation of the valve. Accordingly, the valve may not be normally open or closed due to the above adhesion. The adhesion is generated due to dehydration on a surface after the surface contact between the glass substrate having a hydrophilic surface and a surface of the valve gate film 13 of a polymer material.

Also, when a plastic substrate having a hydrophobic surface is used as the first and second substrates 11 and 12, the first and second substrates 11 and 12 are surface-processed and are combined to the valve gate film 13 by using an adhesive. In this case, the above-described adhesion between the valve seat 18 and the valve gate film 13 may be generated. Also, as the adhesive comes into the micro-flow path 16, the flow of a fluid may be restricted or effectively prevented.

Figure 5:
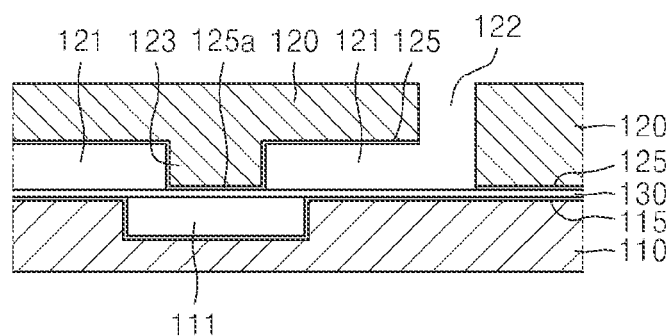
FIG. 5 is a cross-sectional view of an embodiment of a microfluidic device, according to the present invention.

FIG. 5 is a cross-sectional view of an embodiment of a microfluidic device, according to the present invention. Referring to FIG. 5, the microfluidic device according to the illustrated embodiment includes first and second substrates 120 and 110, first and second parylene layers 125 and 115 respectively disposed on the first and second substrates 120 and 110, and a valve gate film 130 provided between the first and second substrates 120 and 110. The first and second substrates 120 and 110 are combined to each other with the valve gate film 130 interposed therebetween. The valve gate film 130 may be a single unitary indivisible part.

The first and second substrates 120 and 110 may be substrates having a hydrophobic surface or a hydrophilic surface. In one embodiment, for example, plastic substrates having hydrophobic surfaces or glass substrates having hydrophilic surfaces, may be used as the first and second substrates 120 and 110. However, the present invention is not limited thereto and substrates including a variety of materials may be used as the first and second substrates 120 and 110.

A micro-flow path 121 and a valve seat 123 are disposed in the first substrate 120. The micro-flow path 121 is a path for flowing a sample or air, through which microfluid flows when portions of the micro-flow path 121 are in fluid connection with each other. The valve seat 123 is to open/close the micro-flow path 121, and protrude into the micro-flow path 121 such that portions of the micro-flow path 121 disposed on opposing sides of the valve seat 123 are not in fluid connection with each other, since the valve seat 123 completely separates the first and second portions from each other. The valve seat 123 is disposed continuously with a remainder of the first substrate 120, thereby forming a single unitary indivisible first substrate 120.

A lower surface of the valve seat 123 at a distal end of the valve seat 123 may be disposed at a same height as a combination surface of the first substrate 120 which contacts the valve gate film 130. A hole 122 for inputting/outputting the sample or air may be disposed in the first substrate 120 and fluidly connected to the micro-flow path 121.

The first parylene layer 125 is disposed on an entire of an inner surface of the first substrate 120 where the micro-flow path 121 and the valve seat 123 are disposed. The inner surface of the first substrate 120, on which the first parylene layer 125 is disposed, includes an inner wall surface of the micro-flow path 121, an outer wall surface of the valve seat 123, and the combination surface of the first substrate 120. A portion 125a of the first parylene layer 125, which is disposed on the lower surface of the valve seat 123, may have a hydrophobic surface. Another portion of the first parylene layer 125, which is disposed on the combination surface of the first substrate 120 that is combined to the second substrate 110, may have a hydrophilic surface. Also, another portion of the first parylene layer 125, which is disposed on the inner wall surface of the micro-flow path 121, may have either a hydrophilic surface or a hydrophobic surface.

A cavity 111 is disposed in the second substrate 110. The cavity 111, which is an empty space to which vacuum or air pressure is applied, may be disposed to correspond to and align with the valve seat 123 in a plan view of the first and second substrates 120 and 110. Although it is not illustrated in the drawings, the cavity 111 may be fluidly connected to the hole for inputting/outputting air. The second parylene layer 115 is disposed on an entire of an inner surface of the second substrate 110 where the cavity 111 is disposed. A portion of the second parylene layer 115, which is disposed on a combination surface of the second substrate 110 that contacts the valve gate film 130 and is combined with first substrate 120, may have a hydrophilic surface. Also, another portion of the second parylene layer 115, which is disposed on the inner wall surface of the cavity 111, may have either a hydrophilic surface or a hydrophobic surface.

The valve gate film 130 is provided between the first substrate 120 and the second substrate 110. The first substrate 120 and the second substrate 110 are combined to each other with the valve gate film 130 interposed therebetween. The valve gate film 130 is movable, such as by air pressure between the valve seat 130 and the cavity 111 to open/close the micro-flow path 121. That is, when the valve gate film 130 contacts the lower surface of the valve seat 123, the micro-flow path 121 is closed. When the valve gate film 130 is separated from the lower surface of the valve seat 123, the micro-flow path 121 is open.

The valve gate film 130 includes a flexible material and a material having a hydrophilic surface. Also, the valve gate film 130 may include a material that reduces or effectively prevents a liquid, such as the sample, from passing through the valve gate film 130 and simultaneously transmits gas such as air. In one embodiment, for example, the valve gate film 130 may include poly(dimethylsiloxane) ("PDMS") based polymer that is processed to be a hydrophilic surface. The microfluidic device according to the illustrated embodiment is manufactured such that the lower surface of the valve seat 123, such as including the first parylene layer 125, may contact the valve gate film 130. Thus, in the microfluidic device according to the illustrated embodiment, the micro-flow path 122 is closed at the initial stage.

Figure 6:
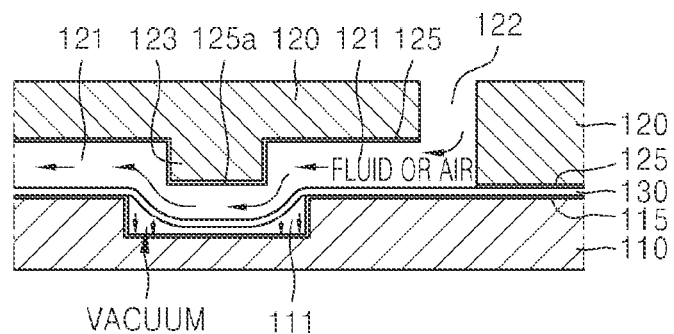
FIGS. 6 and 7 are cross-sectional views, respectively, illustrating the open and closed states of the valve of the microfluidic device of FIG. 5.
Figure 7:
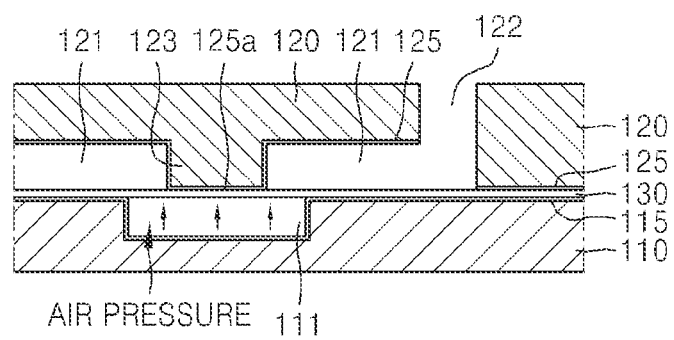

FIGS. 6 and 7 are cross-sectional views, respectively, illustrating the open and closed states of the valve of the microfluidic device of FIG. 5. Referring first to FIG. 6, when vacuum (indicated by the downward pointing arrows) is applied to the cavity 111 disposed in the second substrate 110, the valve gate film 130 contacting the lower surface of the valve seat 123 descends toward the cavity 111 so that the micro-flow path 121 may be open. Then, the sample or air may be moved through the micro-flow path 121 that is open, since first and second portions of the micro-flow path 121 disposed on opposing sides of the valve seat 123 are in fluid connection with each other as indicated by the arrows through the micro-flow path 121.

Referring to FIG. 7, when air pressure (indicated by the upward pointing arrows) is applied to the cavity 111, the valve gate film 130 existing in the cavity 111 ascends toward the valve seat 123 to contact the lower surface of the valve seat 123 so that the micro-flow path 121 may be closed. The sample or air may not be moved through the micro-flow path 121 that is closed, since the first and second portions of the micro-flow path 121 disposed on opposing sides of the valve seat 123 are not in fluid connection with each other.

Since the portion 125a of the first parylene layer 125, which is disposed on the lower surface of the valve seat 123, has a hydrophobic surface and the valve gate film 130 has a hydrophilic surface, the valve gate film 130 may be easily detached from the lower surface of the valve seat 123 including the first parylene layer 125 when the valve is opened. Accordingly, as a valve system is smoothly operated, the sample in a quantity desired by a user may be accurately transferred through the micro-flow path 121. Also, since the first and second parylene layers 125 and 115 respectively disposed on the combination surfaces of the first and second substrates 120 and 110 have hydrophilic surfaces, the combination surfaces of the first and second substrates 120 and 110 and the valve gate film 130 may be firmly combined to each other. Thus, leaking of the sample in the micro-flow path 121 to an outside of the microfluidic device may be reduced or effectively prevented. When plastic substrates that are inexpensive are used as the first and second substrates 120 and 110, since a variety of depths may be implemented by one-time molding process, unlike the case of using a glass substrate, the microfluidic device may be manufactured by a simple process.

Figure 8:
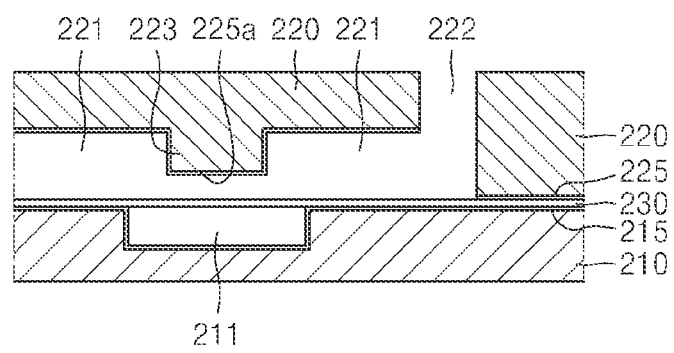
FIG. 8 is a cross-sectional view of another embodiment of a microfluidic device, according to the present invention.

FIG. 8 is a cross-sectional view of another embodiment of a microfluidic device, according to the present invention. In the following description, differences from the above-described embodiment will be mainly discussed.

Referring to FIG. 8, the microfluidic device according to the illustrated embodiment includes first and second substrates 220 and 210, first and second parylene layers 225 and 215 respectively disposed on the first and second substrates 220 and 210, and a valve gate film 230 provided between the first and second substrates 220 and 210. The valve gate film 230 may be a single unitary indivisible part. The first and second substrates 220 and 210 may be substrates having hydrophobic surfaces or hydrophilic surfaces. A micro-flow path 221 and a valve seat 223 protruding into the micro-flow path 221 are disposed in the first substrate 220. The valve seat 223 is disposed continuously with a remainder of the first substrate 220, thereby forming a single unitary indivisible first substrate 220.

The lower surface of the valve seat 223 at a distal end of the valve seat 223 may be disposed to be higher than a combination surface of the first substrate 220. A hole 222 for inputting/outputting a sample or air may be disposed in the first substrate 220 and fluidly connected to the micro-flow path 221.

The first parylene layer 225 is disposed on an entire of an inner surface of the first substrate 220 where the micro-flow path 221 and the valve seat 223 are disposed. A portion 225a of the first parylene layer 225, which is disposed on the lower surface of the valve seat 223, may have a hydrophobic surface. Another portion of the first parylene layer 225, which is disposed on the combination surface of the first substrate 220, may have a hydrophilic surface. Another portion of the first parylene layer 225, which is disposed on an inner wall surface of the micro-flow path 221, may have either a hydrophilic surface or a hydrophobic surface.

A cavity 211 is disposed in the second substrate 210. The second parylene layer 215 is disposed on an entire of an inner surface of the second substrate 210 where the cavity 211 is disposed. A portion of the second parylene layer 215, which is disposed on a combination surface of the second substrate 210, may have a hydrophilic surface. Another portion of the second parylene layer 215, which is disposed on the inner wall surface of the cavity 211, may have either a hydrophilic surface or a hydrophobic surface.

The valve gate film 230 is provided between the first and second substrates 220 and 210. The first and second substrates 220 and 210 are combined to each other with the valve gate film 230 interposed therebetween. The valve gate film 230 may be separated from the lower surface of the valve seat 223, unlike the above-described embodiment in FIGS. 5-7. The valve gate film 230 includes a flexible material and a material having a hydrophilic surface. Also, the valve gate film 230 may include a material that reduces or effectively prevents a liquid, such as the sample, from passing through the valve gate film 230 and simultaneously transmits gas such as air. In one embodiment, for example, the valve gate film 230 may include poly(dimethylsiloxane) ("PDMS") based polymer that is processed to be a hydrophilic surface.

As described above, the microfluidic device according to the illustrated embodiment is manufactured such that the lower surface of the valve seat 223 may be separated from the valve gate film 230. Thus, in the microfluidic device according to the illustrated embodiment, the micro-flow path 122 is open at the initial stage.

Figure 9:
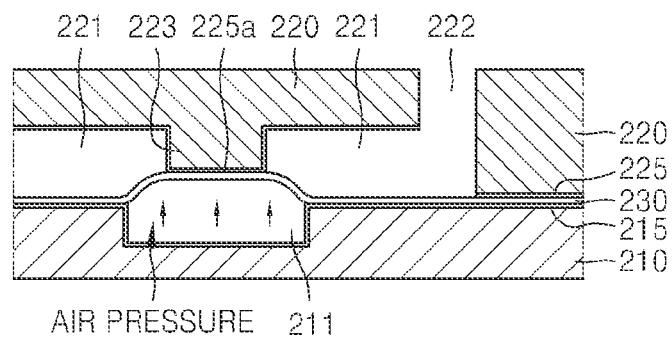
FIGS. 9 and 10 are cross-sectional views, respectively, illustrating the closed and open states of the valve of the microfluidic device of FIG. 8.
Figure 10:
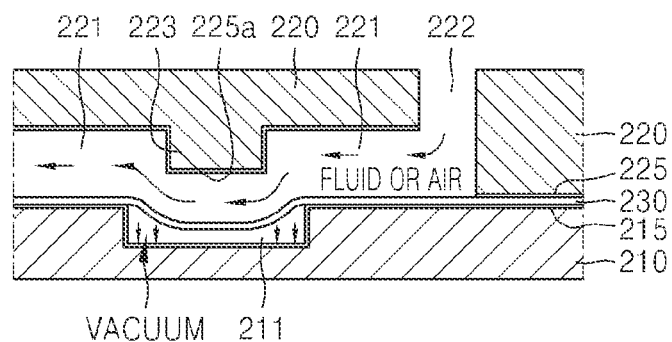

FIGS. 9 and 10 are cross-sectional views, respectively, illustrating the closed and open states of the valve of the microfluidic device of FIG. 8. Referring first to FIG. 9, when air pressure (indicated by the upward pointing arrows) is applied to the cavity 211, the valve gate film 230 ascends toward the valve seat 223 to contact the lower surface of the valve seat 223 so that the micro-flow path 221 may be closed. The sample or air may not be moved through the micro-flow path 221 that is closed, since the first and second portions of the micro-flow path 221 disposed on opposing sides of the valve seat 123 are not in fluid connection with each other.

Referring to FIG. 10, when vacuum (indicated by the downward pointing arrows) is applied to the cavity 211, the valve gate film 230 contacting the lower surface of the valve seat 223 descends toward the cavity 211 so that the micro-flow path 221 may be open. The sample or air may be moved through the micro-flow path 221 that is open, since first and second portions of the micro-flow path 221 disposed on opposing sides of the valve seat 223 are in fluid connection with each other as indicated by the arrows through the micro-flow path 221.

Figure 11:
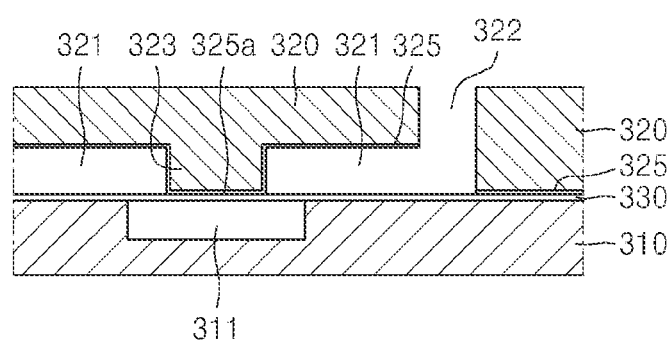
FIG. 11 is a cross-sectional view of another embodiment of a microfluidic device, according to the present invention.

FIG. 11 is a cross-sectional view of another embodiment of a microfluidic device, according to the present invention. In the following description, differences from the above-described embodiments will be mainly discussed.

Referring to FIG. 11, the microfluidic device according to the illustrated embodiment includes first and second substrates 320 and 310, a parylene layer 325 disposed on the first substrate 320, and a valve gate film 330 provided between the first and second substrates 320 and 310. The valve gate film 330 may be a single unitary indivisible part. The valve gate film 330 directly contacts an upper surface of the second substrate 310, unlike the embodiments of FIGS. 5-10. The first substrate 320, on which the parylene layer 325 is disposed, may be a substrate having a hydrophobic surface or a hydrophilic surface. In one embodiment, for example, the first substrate 320 may be a plastic substrate or a glass substrate, but the present invention is not limited thereto. The second substrate 310 may be a substrate having a hydrophilic surface. In one embodiment, for example, the second substrate 310 may be a glass substrate, but the present invention is not limited thereto.

A micro-flow path 321, and a valve seat 323 protruding into the micro-flow path 321 are disposed in the first substrate 320. The valve seat 323 is disposed continuously with a remainder of the first substrate 320, thereby forming a single unitary indivisible first substrate 320. A lower surface of the valve seat 323 may be disposed at a same height as a combination surface of the first substrate 320 which contacts the valve gate film 330. A hole 322 for inputting/outputting a sample or air may be disposed in the first substrate 320 and fluidly connected to the micro-flow path 321.

The parylene layer 325 is disposed on an inner surface of the first substrate 320 where the micro-flow path 321 and the valve seat 323 are disposed. In the illustrated embodiment, only a single parylene layer 325 is disposed between the first and second substrates 320 and 310, unlike the embodiments of FIGS. 5-10. A portion 325a of the parylene layer 325, which is disposed on the lower surface of the valve seat 323, may have a hydrophobic surface. Another portion of the parylene layer 325, which is disposed on the combination surface of the first substrate 320, may have a hydrophilic surface. Also, another portion of the parylene layer 325, which is disposed on the inner wall surface of the micro-flow path 321, may have either a hydrophilic surface or a hydrophobic surface. A cavity 311 corresponding to and aligned with the valve seat 323 is disposed in the second substrate 310.

The valve gate film 330 is provided between the first substrate 320 and the second substrate 310. The first substrate 320 and the second substrate 310 are combined to each other with the valve gate film 330 interposed therebetween. The valve gate film 330 is disposed to contact the lower surface of the valve seat 323 including the parylene layer 325. The valve gate film 330 includes a flexible material and a material having a hydrophilic surface. Also, the valve gate film 330 may include a material that reduces or effectively prevents a liquid, such as the sample, from passing through the valve gate film 330 and simultaneously transmits gas such as air. In one embodiment, for example, the valve gate film 330 may include poly(dimethylsiloxane) ("PDMS") based polymer that is processed to be a hydrophilic surface.

The microfluidic device according to the illustrated embodiment is manufactured such that the lower surface of the valve seat 323 including the parylene layer 325 may directly contact the valve gate film 330. Thus, in the microfluidic device according to the illustrated embodiment, the micro-flow path 321 is closed at the initial stage.

As described above, since the portion 325a of the parylene layer 325, which is disposed on the lower surface of the valve seat 323, has a hydrophobic surface and the valve gate film 330 has a hydrophilic surface, the valve gate film 330 may be easily detached from the lower surface of the valve seat 323 when the valve is opened. Also, since the portion 325a of the parylene layer 325, which is disposed on the combination surface of first substrate 320 has a hydrophilic surface and the second substrate 310 has a hydrophilic surface, the combination surfaces of the first and second substrates 320 and 310 and the valve gate film 330 may be firmly combined to each other.

Figure 12:
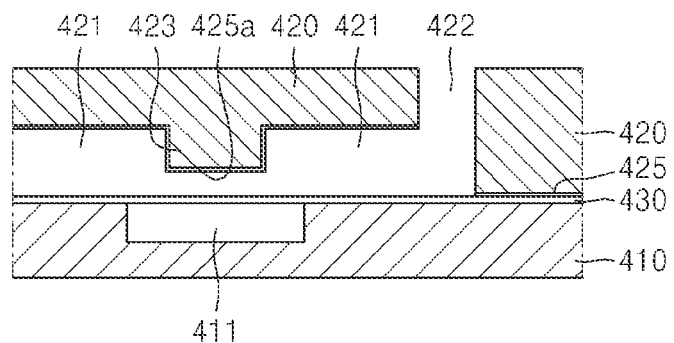
FIG. 12 is a cross-sectional view of another embodiment of a microfluidic device, according to the present invention.

FIG. 12 is a cross-sectional view of another embodiment of a microfluidic device, according to the present invention. Referring to FIG. 12, the microfluidic device according to the illustrated embodiment includes first and second substrates 420 and 410, a single parylene layer 425 disposed on the first substrate 420, and a valve gate film 430 provided between the first and second substrates 420 and 410. The valve gate film 430 may be a single unitary indivisible part. The first substrate 420, on which the parylene layer 425 is disposed, may be a substrate having a hydrophobic surface or a hydrophilic surface. The second substrate 410 may be a substrate having a hydrophilic surface.

A micro-flow path 421, and a valve seat 423 protruding into the micro-flow path 421 are disposed in the first substrate 420. The valve seat 423 is disposed continuously with a remainder of the first substrate 420, thereby forming a single unitary indivisible first substrate 420. A lower surface of the valve seat 423 may be disposed to be higher than (e.g., non-coplanar with) a combination surface of the first substrate 420. A hole 422 for inputting/outputting a sample or air may be disposed in the first substrate 420 and fluidly connected to the micro-flow path 421.

The parylene layer 425 is disposed on an inner surface of the first substrate 420 where the micro-flow path 421 and the valve seat 423 are disposed. In the illustrated embodiment, only a single parylene layer 425 is disposed between the first and second substrates 420 and 410, unlike the embodiments of FIGS. 5-10. A portion 425a of the first parylene layer 425, which is disposed on the lower surface of the valve seat 423, may have a hydrophobic surface. Another portion of the first parylene layer 425, which is disposed on the combination surface of the first substrate 420, may have a hydrophilic surface. Another portion of the first parylene layer 425, which is disposed on an inner wall surface of the micro-flow path 421, may have either a hydrophilic surface or a hydrophobic surface. A cavity 411 corresponding to and aligned with the valve seat 423 is disposed in the second substrate 410.

The valve gate film 430 is provided between the first and second substrates 420 and 410. The first and second substrates 420 and 210 are combined to each other with the valve gate film 430 interposed therebetween. The valve gate film 430 may be separated from the lower surface of the valve seat 423. The valve gate film 430 may include a flexible material and a material having a hydrophilic surface. Also, the valve gate film 430 may include a material that reduces or effectively prevents a liquid, such as the sample, from passing through the valve gate film 430 and simultaneously transmits gas such as air.

The microfluidic device according to the illustrated embodiment is manufactured such that the lower surface of the valve seat 423 may be separated from the valve gate film 430. Thus, in the microfluidic device according to the illustrated embodiment, the micro-flow path 421 is open at the initial stage.

In the embodiments illustrated in FIGS. 8 and 12, as the lower surfaces of the valve seats 223 and 423 and the valve gate films 230 and 430 are initially manufactured to be separated from each other, it is not likely that the lower surfaces of the valve seats 223 and 423 are attached to the valve gate films 230 and 430 in the manufacturing process of a microfluidic device. Thus, in the embodiments illustrated in FIGS. 8 and 12, a microfluidic device may be manufactured without having to perform the above-described complicated process of maintaining the hydrophobic surfaces of the portions 225a and 425a of the parylene layers 215, 225, and 425 while processing the other portions to have hydrophilic surfaces.

For example, in the embodiment of FIG. 12, when hydrophobic polymer based plastic, such as polymethyl methacrylate (PMMA), polystyrene (PS), poly carbonate (PC), or poly ethylene (PE), which is not easy to bond with oxygen, is used as the first substrate 420, a SiO2 layer having a hydrophilic feature instead of the parylene layer 425 may be coated on the entire surface of the first substrate 420. In other words, the micro-flow path 421, the lower surface of the valve seat 423, and the lower surface of the first substrate 420 to be boned to the valve gate film 430 (that is, the surface of the first substrate 420 facing the valve gate film 430) are all coated with a SiO2 layer having a hydrophilic feature. Thereafter, O2 plasma processing is performed on the first substrate 420 and the valve gate film 430 and thus the valve gate film 430 may be bonded to the lower surface of the first substrate 420. As described above, as the lower surface of the valve seat 423 and the valve gate film 430 are initially separated from each other, it is not likely that the lower surface of the valve seat 423 is attached to the valve gate film 430 in the process of bonding the valve gate film 430 to the lower surface of the first substrate 420.

The valve gate film 430 may be formed of, for example, a hydrophobic material such as PDMS. The surface of the valve gate film 430 may be temporarily changed to a hydrophilic surface during $_2$ plasma processing. Then, a portion of the surface of the valve gate film 430 contacting the lower surface of the first substrate 420 may be perpetually bonded to the lower surface of the first substrate 420. However, the other portion of the surface of the valve gate film 430 that does not contact the lower surface of the first substrate 420 naturally resumes its original surface feature (that is, a hydrophobic feature) when contacting air as a predetermined time passes. Accordingly, during the operation of a microfluidic device, it is not likely that the lower surface of the valve seat 423 is attached to the valve gate film 430 because the lower surface of the valve seat 423 is hydrophilic (for example, SiO$_2$ coating) and the valve gate film 430 is hydrophobic.

If a glass based material having a hydrophilic feature or PDMS is used as the first substrate 420, the SiO$_2$ coating may not be formed. Although PDMS is hydrophilic, PDMS has a polymer chain formed of a silicon-oxygen bonding and thus the surface of PDMS may be easily processed to be hydrophilic by O$_2$ plasma processing. Thus, in this case, the valve gate film 430 may be bonded to the first substrate 420 by only O$_2$ plasma processing without the SiO$_2$ coating.

The above description may be applied directly to the second substrate 410. For example, when the second substrate 410 is formed of a hydrophobic material such as glass or a polymer material having a silicon-oxygen bonding such as PDMS, the valve gate film 430 may be bonded to the second substrate 410 by only O$_2$ plasma processing without performing the SiO$_2$ coating on the lower surface of the second substrate 410. In contrast, when the second substrate 410 is formed of hydrophobic polymer based plastic such as PMMA, PS, PC, or PE, the O$_2$ plasma processing is performed after the SiO$_2$ coating is performed on the inner surface of the second substrate 410, and thus the valve gate film 430 may be bonded to the second substrate 410.

An embodiment of a method of manufacturing the above-described microfluidic device will be described below. FIGS. 13-17 are cross-sectional views illustrating the embodiment of the method of manufacturing a microfluidic device, according to the present invention.

Figure 13:
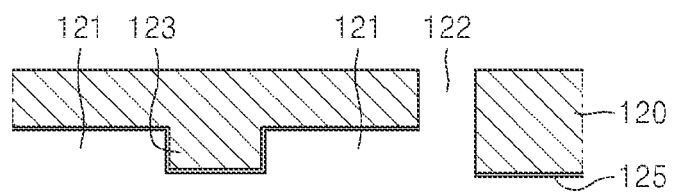
FIGS. 13-17 are cross-sectional views illustrating an embodiment of a method of manufacturing a microfluidic device, according to the present invention.
Figure 13:
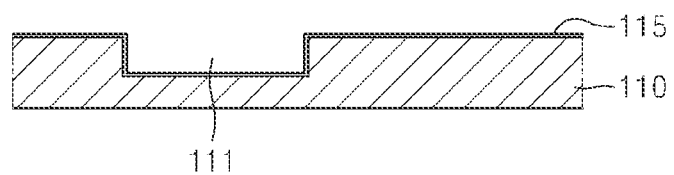

Referring to FIG. 13, the first substrate 120 where the micro-flow path 121 and the valve seat 123 are formed, is provided. The first parylene layer 125 is disposed on the inner surface of the first substrate 120. The first substrate 120 may be a substrate having either a hydrophobic surface or a hydrophilic surface. In one embodiment, for example, a plastic substrate having a hydrophobic surface or a glass substrate having a hydrophilic surface may be used as the first substrate 120. However, the present invention is not limited thereto and a substrate including one of a variety of materials may be used as the first substrate 120. The hole 122 for inputting/outputting a sample or air may be formed in the first substrate 120 and fluidly connected to the micro-flow path 121.

The first parylene layer 125 may be formed by depositing parylene on the inner surface of the first substrate 120, by a chemical vapour deposition ("CVD") method, for example. The parylene is a material having a hydrophobic surface. The first parylene layer 125 may have a thickness of, for example, about several micrometers (μm), the thickness taken substantially perpendicular to the first substrate 120. The first parylene layer 125 is processed to have a hydrophilic surface. The first parylene layer 125 may be processed to have a hydrophilic surface by, for example, a UV oxygen process, an O$_2$ plasma process, or a corona process. However, the present invention is not limited thereto.

The second substrate 110 where the cavity 111 is formed, is provided. The second parylene layer 115 is formed on an entire of the inner surface of the second substrate 110. The second substrate 110, like the first substrate 120, may be a substrate having either a hydrophobic surface or a hydrophilic surface. In one embodiment, for example, a plastic substrate having a hydrophobic surface or a glass substrate having a hydrophilic surface may be used as the second substrate 110.

The second parylene layer 115 may be formed by depositing parylene on the inner surface of the second substrate 110, such as by the CVD method. The second parylene layer 115 may have a thickness of, for example, about several micrometers (μm). The second parylene layer 115 is initially processed to have a hydrophilic surface. The second parylene layer 115, like the first parylene layer 125, may be processed to have a hydrophilic surface by, for example, a UV oxygen process, an O$_2$ plasma process, or a corona process. The inner surfaces of the first and second substrates 120 and 110 may be pre-processed to facilitate the deposition of the first and second parylene layers 125 and 115.

Figure 14:
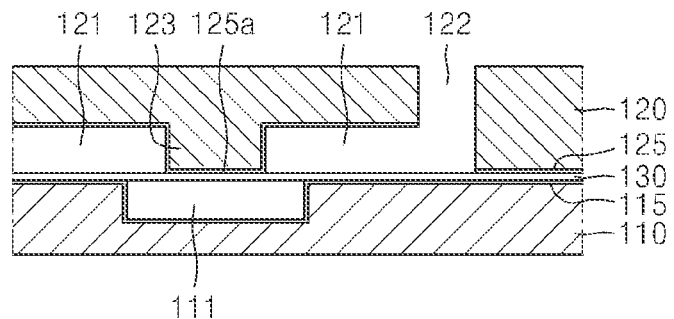

Referring to FIG. 14, the valve gate film 130 is provided. The valve gate film 130 may be formed of a flexible material that reduces or effectively prevents a liquid, such as the sample, from passing through the valve gate film 130 and simultaneously transmits gas such as air. In one embodiment, for example, the valve gate film 130 may be formed of poly (dimethylsiloxane) ("PDMS") based polymer having a hydrophilic surface. The valve gate film 130, like the above-described first and second parylene layers 125 and 115, may be processed to have a hydrophilic surface by, for example, a UV oxygen process, an O$_2$ plasma process, or a corona process. However, the present invention is not limited thereto.

The valve gate film 130 is provided between the first and second substrates 120 and 110 upon which the first and second parylene layers 125 and 115 have been formed. The first and second substrates 120 and 110 and the valve gate film 130 are combined to each other by using an appropriate pressure. Since the first and second substrates 120 and 110 and the valve gate film 130 are all processed to have hydrophilic surfaces, the respective combination surfaces of the first and second substrates 120 and 110 and the valve gate film 130 may be easily and firmly combined to each other in an atmosphere of the room temperature. The lower surface of the valve seat 123 including the first parylene layer 125 may directly contact the valve gate film 130.

Figure 15:
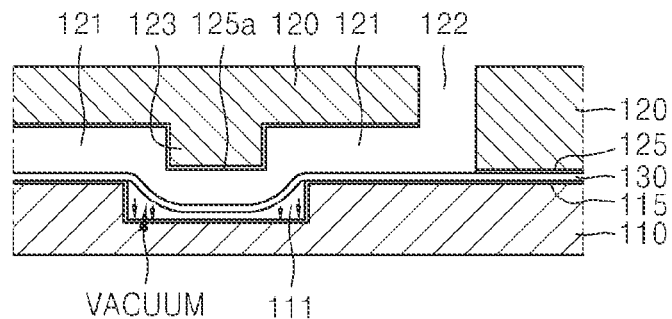
Figure 16:
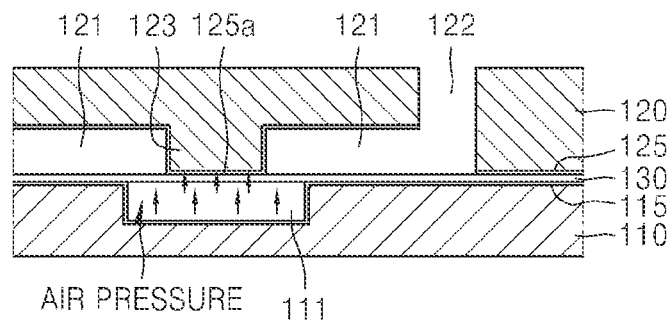

Referring to FIG. 15, when vacuum is applied to the cavity 111 formed in the second substrate 110, the valve gate film 130 contacting the lower surface of the valve seat 123 descends toward the cavity 111. Referring to FIG. 16, when air pressure is applied to the cavity 111, the valve gate film 130 ascends toward the valve seat 123 to contact the lower surface of the valve seat 123. Since the valve gate film 130 is formed of a material that transmits air, the air may pass through the valve gate film 130 due to the air pressure applied to the cavity 111, as indicated by the arrows passing upwardly through the valve gate film 130. Accordingly, the portion 125a of the first parylene layer 125, which is formed on the lower surface of the valve seat 123, contacts the air that has passed through the valve gate film 130. When the vacuum and air pressure are repeatedly applied to the cavity 111, the portion 125a of the first parylene layer 125, which is formed on the lower surface of the valve seat 123, repeatedly contacts the air so that the surface thereof may changed to be hydrophobic.

When the first parylene layer 125 that is initially processed to have a hydrophilic surface is exposed to air for a predetermined time, for example, about seventy-two (72) hours, the surface of the first parylene layer 125 is changed back to be hydrophobic. Thus, as described above, as the portion 125a of the first parylene layer 125, which is formed on the lower surface of the valve seat 123, repeatedly contacts the air that has passed through the valve gate film 130, the change of the surface of the first parylene layer 125 to be hydrophobic may be facilitated.

When the portion 125a of the first parylene layer 125, which is formed on the lower surface of the valve seat 123, is processed to have a hydrophobic surface, the valve gate film 130 having a hydrophilic surface may be easily detached from the lower surface of the valve seat 123. Also, since the portions of the first and second parylene layers 125 and 115, which are formed on the combination surfaces of the first and second substrates 120 and 110, have hydrophilic surfaces, the combination surfaces of the first and second substrates 120 and 110 and the valve gate film 130 may be firmly combined to each other. Thus, leaking of the sample in the micro-flow path 121 to an outside of the microfluidic device, maybe reduced or effectively prevented.

When a plastic substrate that is inexpensive is used as the first and second substrates 120 and 110, the manufacturing cost of the microfluidic device may be much reduced. Also, in this case, since a variety of depths may be implemented by one-time molding process, unlike the case of using a glass substrate, the microfluidic device may be manufactured by a relatively simple process.

Figure 17:
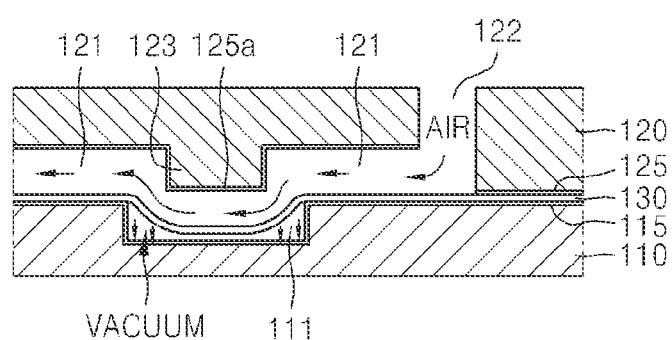

The processing of the surface of the portion 125a of the first parylene layer 125, which is formed on the lower surface of the valve seat 123, to be hydrophobic, may be performed in the following method. Referring to FIG. 17, when vacuum is applied to the cavity 111, the valve gate film 130 contacting the lower surface of the valve seat 123 descends toward the cavity 111 so that the micro-flow path 121 may be open. When air pressure is provided through the micro-flow path 121 for a predetermined time, the surface of the first parylene layer 125 formed on the inner wall surface of the micro-flow path 121 and the outer wall surface of the valve seat 123 may be processed to be hydrophobic due to the contact with the air for a predetermined time. Accordingly, the portion 125a of the first parylene layer 125, which is formed on the lower surface of the valve seat 123, may have a hydrophobic surface.

In the above-described embodiment, although the lower surface of the valve seat 123 including the first parylene layer 125 is formed to be able to contact the valve gate film 130, the lower surface of the valve seat 123 including the first parylene layer 125 may be separated from the valve gate film 130, as illustrated in FIG. 8.

FIGS. 18-22 are cross-sectional views illustrating another embodiment of a method of manufacturing a microfluidic device, according to the present invention. In the following description, differences from the above-described embodiment will be mainly discussed.

Figure 18:
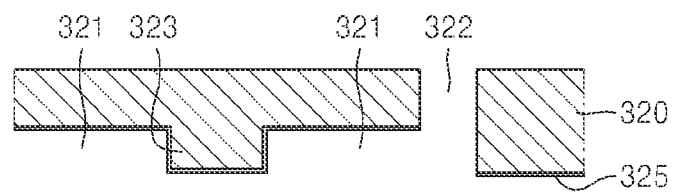
FIGS. 18-22 are cross-sectional views illustrating another embodiment of a method of manufacturing a microfluidic device, according to the present invention.

Referring to FIG. 18, the first substrate 320 where the micro-flow path 321 and the valve seat 323 are formed is provided. The parylene layer 325 is formed on an entire of the inner surface of the first substrate 320. The first substrate 320 may be a substrate having either a hydrophobic surface or a hydrophilic surface. In one embodiment, for example, a plastic substrate having a hydrophobic surface or a glass substrate having a hydrophilic surface may be used as the first substrate 320. The hole 322 for inputting/outputting the sample or air may be formed in the first substrate 320 and fluidly connected to the micro-flow path 321.

The parylene layer 325 is initially processed to have a hydrophilic surface. The parylene layer 325 may be processed to have a hydrophilic surface by, for example, a UV oxygen process, an $O_2$ plasma process, or a corona process. However, the present invention is not limited thereto. The inner surface of the first substrate 320 may be processed to facilitate the deposition of the parylene layer 325. The second substrate 310 where the cavity 311 is formed, is provided. The second substrate 310 may be a substrate having a hydrophilic surface. Although a glass substrate may be used as the first substrate 310, the present invention is not limited thereto.

Figure 19:
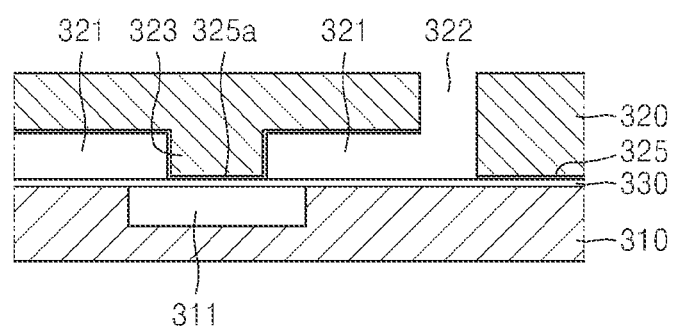

Referring to FIG. 19, the valve gate film 330 is provided. The valve gate film 330 may be formed of a flexible material that reduces or effectively prevents a liquid, such as the sample, from passing through the valve gate film 330 and simultaneously transmits gas such as air. In one embodiment, for example, the valve gate film 330 may be formed of poly (dimethylsiloxane) ("PDMS") based polymer having a hydrophilic surface. The valve gate film 330 may be processed to have a hydrophilic surface by, for example, a UV oxygen process, an $O_2$ plasma process, or a corona process.

The valve gate film 330 is provided between the first and second substrates 320 and 310. The first and second substrates 320 and 310 and the valve gate film 330 are combined to each other by using an appropriate pressure. Since the parylene layer 325 formed on the inner surface of the first substrate 320, the valve gate film 330, and the second substrate 310 all have hydrophilic surfaces, the combination surfaces of the first and second substrates 320 and 310 and the valve gate film 330 may be easily and firmly combined to each other in an atmosphere of the room temperature. The lower surface of the valve seat 323 including the parylene layer 325 may directly contact the valve gate film 330.

Figure 20:
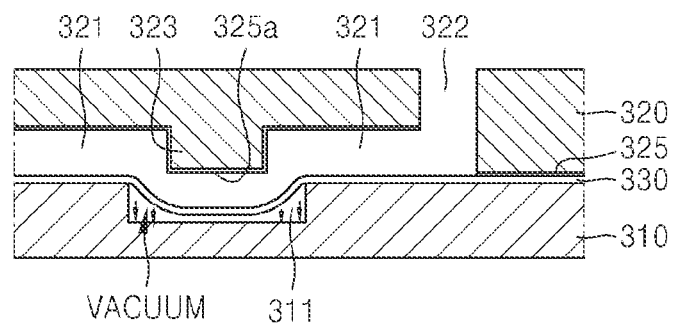
Figure 21:
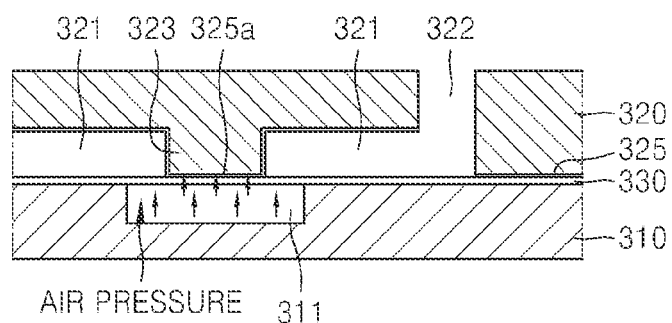

Referring to FIG. 20, when vacuum is applied to the cavity 311 formed in the second substrate 310, the valve gate film 330 contacting the lower surface of the valve seat 323 descends toward the cavity 311. Referring to FIG. 21, when air pressure is applied to the cavity 311, the valve gate film 330 ascends toward the valve seat 323 to contact the lower surface of the valve seat 323. Since the valve gate film 330 is formed of a material that transmits air, the air passes through the valve gate film 330 by the air pressure applied to the cavity 311, as indicated by the arrows passing upwardly through the valve gate film 130. Accordingly, the portion 325a of the parylene layer 325, which is formed on the lower surface of the valve seat 323, contacts the air that has passed through the valve gate film 330. When the vacuum and air pressure are repeatedly applied to the cavity 311, the portion 325a repeatedly contacts the air so that the surface of the portion 325a may be changed to be hydrophobic.

Figure 22:
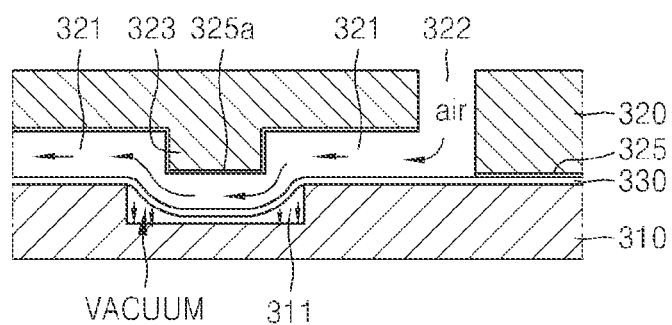

The processing of the surface of the portion 325a of the parylene layer 325, which is formed on the lower surface of the valve seat 323, to be hydrophobic, may be performed in the following method. Referring to FIG. 22, when vacuum is applied to the cavity 311, the valve gate film 330 contacting the lower surface of the valve seat 323 descends toward the cavity 311 so that the micro-flow path 321 may be open. When air pressure is provided through the micro-flow path 321 for a predetermined time, the surface of the parylene layer 325 formed on the inner wall surface of the micro-flow path 321 and the outer wall surface of the valve seat 323 may be processed to be hydrophobic due to the contact with the air for a predetermined time. Accordingly, the portion 325a of the parylene layer 325, which is formed on the lower surface of the valve seat 323, may have a hydrophobic surface.

In the above-described embodiment, although the lower surface of the valve seat 323 including the parylene layer 325 is formed to be able to contact the valve gate film 330, the lower surface of the valve seat 323 including the parylene layer 325 may be separated from the valve gate film 330, as illustrated in FIG. 11.

As described above, since the parylene layer formed on the lower surface of the valve seat and contacted by the valve gate film has a hydrophobic surface, the valve gate film having a hydrophilic surface may be easily separated from the lower surface of the valve seat including the parylene layer so that the valve system may be smoothly operated. Since the respective combination surfaces of the first and second substrates and the valve gate film all have hydrophobic surfaces, the combination surfaces of the first and second substrates and the valve gate film may be firmly combined to each other. Thus, leaking of the sample in the micro-flow path to an outside of the microfluidic device may be reduced or effectively prevented.

Since both of the first substrate where the micro-flow path is formed and the second substrate where the cavity are manufactured by using inexpensive plastic substrates, the manufacturing costs of a microfluidic device may be reduced. Also, when plastic substrates are used as the first and second substrates, since a variety of depths may be implemented by one-time molding process, unlike the case of using a glass substrate, the microfluidic device may be manufactured by a simple process.

It should be understood that the embodiments described herein should be considered in a descriptive sense only and not for purposes of limitation. Descriptions of features within each embodiment should typically be considered as available for other similar features in other embodiments.

What is claimed is:

1. A microfluidic device comprising:
    a first substrate including a micro-flow path and a valve seat protruding into the micro-flow path, the first substrate being formed of a hydrophobic material;
    a second substrate coupled to the first substrate and including a cavity aligned with the valve seat;
    a valve gate film provided between the first substrate and the second substrate, such that the valve gate film opens and closes the micro-flow path with air pressure applied to the cavity, the valve gate film being formed of a hydrophobic material; and
    a first hydrophilic coating disposed on an entire surface of the hydrophobic first substrate, a portion of the first hydrophilic coating being disposed on a surface of the valve seat facing the hydrophobic valve gate film such that the surface of the valve seat is not attached to the valve gate film,
    wherein a height of the valve seat is less than a depth of the micro-flow path such that the portion of the first hydrophilic coating disposed on the surface of the valve seat is separated from the valve gate film and the micro-flow path is opened when air pressure is not applied to the cavity, and
    wherein the valve gate film moves to be in contact with the portion of the first hydrophilic coating disposed on the surface of the valve seat and the micro-flow path is closed when air pressure is applied to the cavity.

2. The microfluidic device of claim 1, wherein the valve gate film is formed of PDMS.

3. The microfluidic device of claim 1, wherein the first substrate is formed of polymer based plastic.

4. The microfluidic device of claim 3, wherein the first substrate is formed of a material including polymethyl methacrylate (PMMA), polystyrene (PS), poly carbonate (PC), or poly ethylene (PE).

5. The microfluidic device of claim 1, wherein the first hydrophilic coating is formed of $SiO_2$.

6. The microfluidic device of claim 1, wherein the second substrate is formed of a hydrophobic material.

7. The microfluidic device of claim 6, wherein the second substrate is formed of a material including polymethyl methacrylate (PMMA), polystyrene (PS), poly carbonate (PC), or poly ethylene (PE).

8. The microfluidic device of claim 6, further comprising a second hydrophilic coating disposed on an entire surface of the hydrophobic second substrate facing the hydrophobic valve gate film.

9. The microfluidic device of claim 8, wherein the hydrophilic coating is formed of $SiO_2$.

* * * * *